US012632136B2

(12) United States Patent
Yeh et al.

(10) Patent No.: US 12,632,136 B2
(45) Date of Patent: **\*May 19, 2026**

(54) ELECTRONIC DEVICE

(71) Applicant: InnoLux Corporation, Miao-Li County (TW)

(72) Inventors: Chia-Min Yeh, Miao-Li County (TW); Hsieh-Li Chou, Miao-Li County (TW); Cheng-Tso Chen, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,789

(22) Filed: May 28, 2024

(65) Prior Publication Data

US 2024/0310946 A1     Sep. 19, 2024

Related U.S. Application Data

(63) Continuation of application No. 18/135,487, filed on Apr. 17, 2023, now Pat. No. 12,019,824.

(60) Provisional application No. 63/340,578, filed on May 11, 2022.

(30) Foreign Application Priority Data

Feb. 1, 2023     (CN) .......................... 202310049854.8

(51) Int. Cl.
*G06F 3/041*          (2006.01)
*G06F 3/044*          (2006.01)

(52) U.S. Cl.
CPC ........ G06F 3/04164 (2019.05); G06F 3/0412 (2013.01); G06F 3/0445 (2019.05)

(58) Field of Classification Search
CPC ...... G06F 3/044; G06F 3/041; G06F 3/04164; G06F 3/0445; G06F 3/0412; H10K 59/40
See application file for complete search history.

(56) References Cited

U.S. PATENT DOCUMENTS

| | | | |
|---|---|---|---|
| 9,817,512 B1 * | 11/2017 | Kim | .................... G06F 3/04184 |
| 2013/0141343 A1 | 6/2013 | Yu | |
| 2016/0358939 A1 | 12/2016 | Lee et al. | |
| 2017/0176798 A1 | 6/2017 | Ahn et al. | |
| 2018/0059855 A1 | 3/2018 | Gwon | |
| 2018/0239477 A1 | 8/2018 | Yang et al. | |

(Continued)

FOREIGN PATENT DOCUMENTS

WO          2022082737 A          4/2022

*Primary Examiner* — Michael A Faragalla
(74) *Attorney, Agent, or Firm* — MUNCY, GEISSLER, OLDS & LOWE, P.C.

(57)          ABSTRACT

An electronic device is provided, which includes: a substrate including a periphery region; a plurality of first pads disposed on the substrate and in the periphery region; a plurality of second pads disposed on the substrate and in the periphery region; and a plurality of redundancy pads disposed on the substrate and in the periphery region, wherein the plurality of first pads are configured to transmit a plurality of data signals, the plurality of second pads are configured to transmit a plurality of signals which are different from the plurality of data signals and a plurality of touch signals, and the plurality of first pads and the plurality of redundancy pads are disposed between two of the plurality of second pads.

7 Claims, 6 Drawing Sheets

(56) References Cited

U.S. PATENT DOCUMENTS

| 2019/0272057 | A1 |   | 9/2019 | Chen |            |
|--------------|-----|---|--------|------|------------|
| 2022/0100319 | A1 |   | 3/2022 | Wang |            |
| 2022/0179513 | A1 |   | 6/2022 | Kim et al. |      |
| 2022/0317508 | A1 |   | 10/2022 | Wang et al. |    |
| 2022/0326831 | A1 | * | 10/2022 | Lee | G06F 3/0418 |
| 2022/0357809 | A1 | * | 11/2022 | Lee | G06F 3/04164 |
| 2023/0027391 | A1 |   | 1/2023 | Cha |             |

* cited by examiner

ELECTRONIC DEVICE

CROSS-REFERENCE TO RELATED APPLICATIONS

This application claims the benefits of the Chinese Patent Application Serial Number 202310049854.8, filed on Feb. 1, 2023, the subject matter of which is incorporated herein by reference.

This application claims the benefit of filing date of U.S. Provisional Application Ser. No. 63/340,578, filed May 11, 2022 under 35 USC § 119(e)(1).

This application is a continuation (CA) of U.S. Patent application for "Touch electronic device", U.S. application Ser. No. 18/135,487 filed Apr. 17, 2023, and the subject matter of which is incorporated herein by reference.

BACKGROUND

Field

The present disclosure relates to an electronic device. More specifically, the present disclosure relates to an electronic device with pads having specific designs.

Description of Related Art

With the advancement of technology and the needs of consumers, the current display device not only has a display function, but also needs to be equipped with other functions, such as a touch function. The built-in touch display device integrating the touch unit and the display unit has the advantages of thinness, high light transmittance, or low cost, and has gradually replaced the external touch display device.

However, in a touch display device, the arrangement order of the signal lines in the active region is usually different from the arrangement order of the signal output terminals in the peripheral region, so that the signal lines must be electrically connected to the signal output terminals through cross-line design, resulting in the defects such as impedance mismatch or electrostatic damage easily occurred.

Therefore, it is desirable to propose new designs for touch electronic devices to improve the conventional defects.

SUMMARY

The present disclosure provides a touch electronic device, which comprises: a substrate comprising a periphery region; a plurality of first pads disposed on the substrate and in the periphery region; a plurality of second pads disposed on the substrate and in the periphery region; and a plurality of redundancy pads disposed on the substrate and in the periphery region, wherein the plurality of first pads are configured to transmit a plurality of data signals, the plurality of second pads are configured to transmit a plurality of signals which are different from the plurality of data signals and a plurality of touch signals, and the plurality of first pads and the plurality of redundancy pads are disposed between two of the plurality of second pads.

Other novel features of the disclosure will become more apparent from the following detailed description when taken in conjunction with the accompanying drawings.

DETAILED DESCRIPTION

Figure 1:
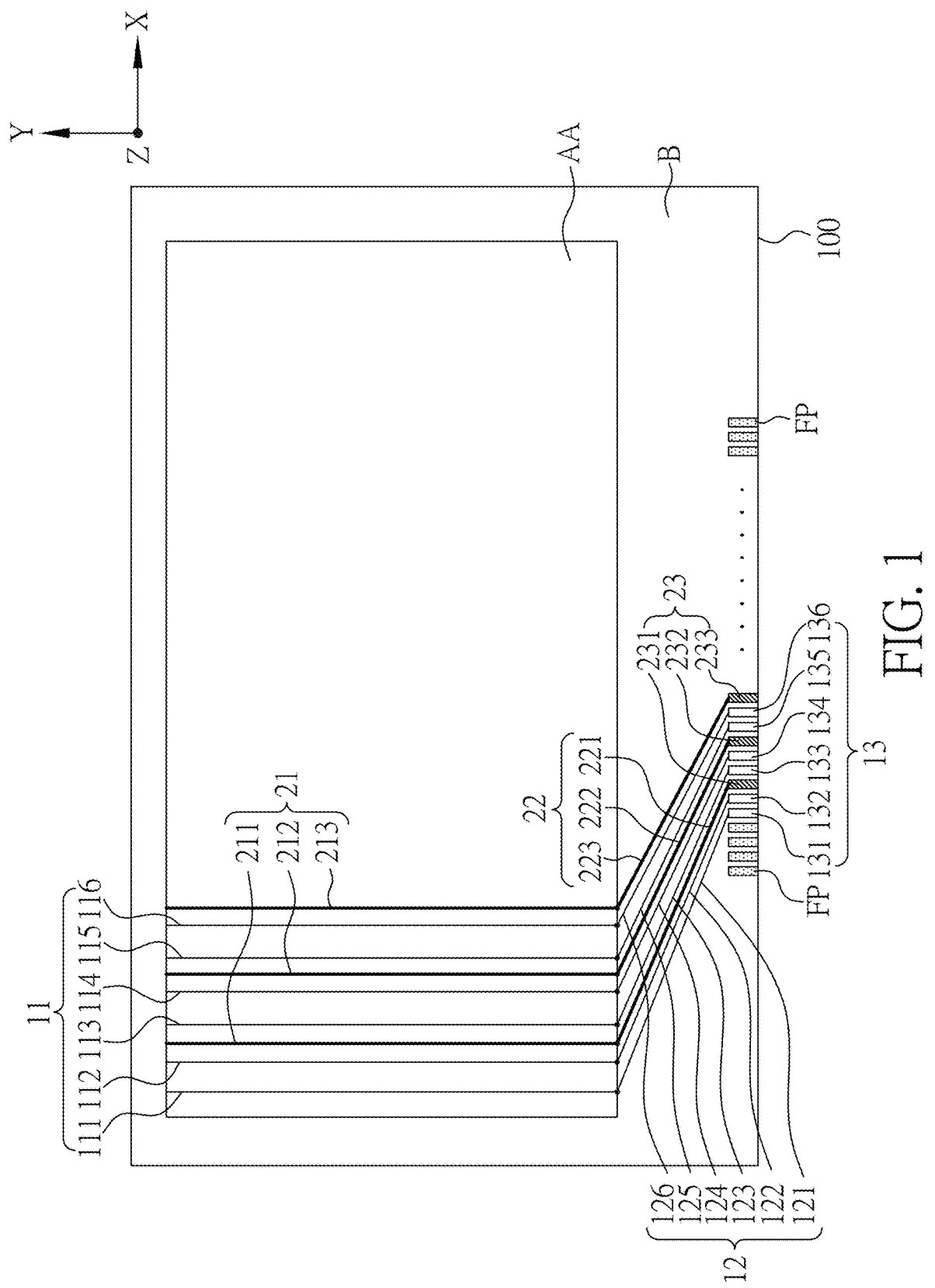
FIG. 1 is a schematic view of a part of a touch electronic device according to one embodiment of the present disclosure.

The following is specific embodiments to illustrate the implementation of the present disclosure. Those who are familiar with this technique can easily understand the other advantages and effects of the present disclosure from the content disclosed in the present specification. The present disclosure can also be implemented or applied by other different specific embodiments, and various details in the present specification can also be modified and changed according to different viewpoints and applications without departing from the spirit of the present disclosure.

It should be noted that, in the present specification, when a component is described to have an element, it means that the component may have one or more of the elements, and it does not mean that the component has only one of the element, except otherwise specified. Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

In the specification and the appended claims of the present disclosure, certain words are used to refer to specific elements. Those skilled in the art should understand that electronic device manufacturers may refer to the same components by different names. The present specification does not intend to distinguish between elements that have the same function but have different names.

In the following description and claims, words such as "comprising", "including", "containing", and "having" are open-ended words, so they should be interpreted as meaning "containing but not limited to . . . ". Therefore, when the terms "comprising", "including", "containing" and/or "having" are used in the description of the present disclosure, they specify the existence of corresponding features, regions, steps, operations and/or components, but do not exclude the existence of one or more corresponding features, regions, steps, operations and/or components.

The terms, such as "about", "equal to", "equal" or "same", "substantially", or "approximately", are generally interpreted as within 10%, 5%, 3%, 2%, 1%, or 0.5% of a given value or range. The quantity given here is an approximate quantity, that is, without specifying "about", "approximately", "substantially" and "approximately", "about", "approximately", "substantially" and "approximately" can still be implied. Furthermore, when a value is "in a range from a first value to a second value" or "in a range between a first value and a second value", the value can be the first value, the second value, or another value between the first value and the second value.

In the present specification, except otherwise specified, the terms (including technical and scientific terms) used herein have the meanings generally known by a person skilled in the art. It should be noted that, except otherwise specified, in the embodiments of the present disclosure, these terms (for example, the terms defined in the generally used dictionary) should have the meanings identical to those known in the art, the background of the present disclosure or the context of the present specification, and should not be read by an ideal or over-formal way.

In addition, relative terms such as "below" or "under" and "on", "above" or "over" may be used in the embodiments to describe the relative relationship between one element and another element in the drawings. It will be understood that if the device in the drawing was turned upside down, elements described on the "lower" side would then become elements described on the "upper" side. When a unit (for example, a layer or a region) is referred to as being "on" another unit, it can be directly on the another unit or there may be other units therebetween. Furthermore, when a unit is said to be "directly on another unit", there is no unit therebetween. Moreover, when a unit is said to be "on another unit", the two have a top-down relationship in a top view, and the unit can be disposed above or below the another unit, and the top-bottom relationship depends on the orientation of the device.

It should be noted that the technical solutions provided by different embodiments hereinafter may be replaced, combined or used in combination, so as to constitute another embodiment without violating the spirit of the present disclosure.

Figure 2:
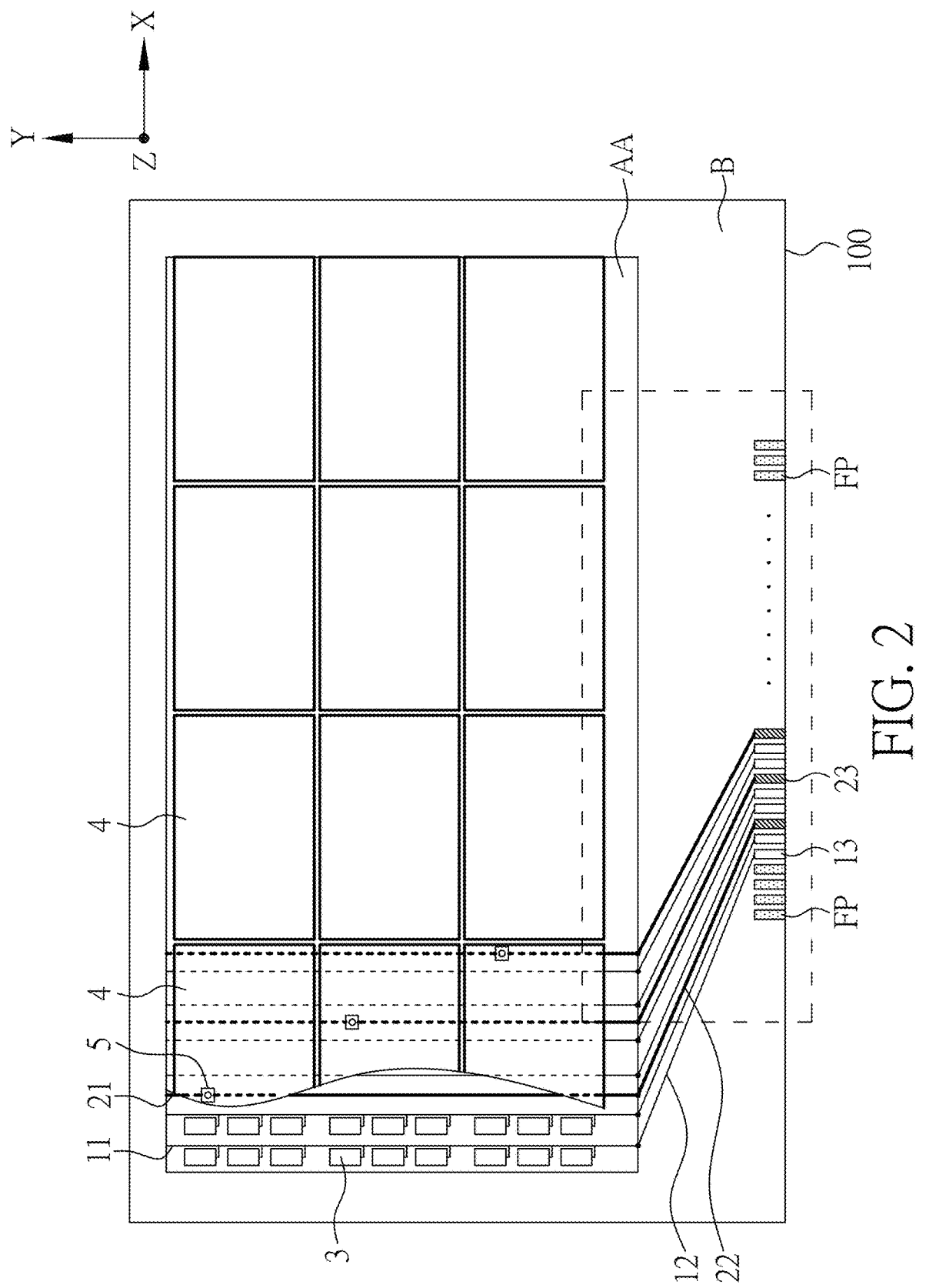
FIG. 2 is a schematic view of a part of a touch electronic device according to one embodiment of the present disclosure.

FIG. 1 and FIG. 2 are schematic views of a part of a touch electronic device according to one embodiment of the present disclosure. FIG. 1 is the same as FIG. 2, but some components such as display units 3 and touch sensing units 4 are not shown FIG. 1 for convenience of explanation.

As shown in FIG. 1 and FIG. 2, the touch electronic device of the present disclosure may comprise a substrate 100; and a plurality of data lines 11, a plurality of data fan-out lines 12, a plurality of first data pads 13, a plurality of touch lines 21, a plurality of touch fan-out lines 22 and a plurality of first touch pads 23 respectively disposed on the substrate 100. The substrate 100 may comprise an active region AA and a periphery region B, which may be disposed adjacent to the active region AA; but the present disclosure is not limited thereto. In addition, the plurality of data fan-out lines 12, the plurality of first data pads 13, the plurality of touch fan-out lines 22 and the plurality of first touch pads 23 may be disposed in the periphery region B of the substrate 100, and the plurality of data lines 11 and the plurality of touch lines 21 may be disposed in the active region AA of the substrate 100. In some embodiments, the active region AA may be, for example, a display region and/or a touch region, and the active region AA nay be defined by edges of the active display units 3 or the touch sensing units 4. For example, for the active display units 3, the endpoint connection of the upper edge of the display unit 3 at the upper left corner and the upper edge of the display units 3 at the upper right corner is defined as the upper boundary of the active region AA, the endpoint connection of the left edge of the display unit 3 at the upper left corner and the left edge of the display units 3 at the lower left corner is defined as the left boundary of the active region AA, the endpoint connection of the right edge of the display unit 3 at the upper right corner and the right edge of the display units 3 at the lower right corner is defined as the right boundary of the active region AA, and the endpoint connection of the lower edge of the display unit 3 at the lower left corner and the lower edge of the display units 3 at the lower right corner is defined as the lower boundary of the active region AA. The periphery region B may be, for example, a non-display region and/or a non-touch region, but the present disclosure is not limited thereto.

In the present disclosure, the substrate 100 may be a quartz substrate, a glass substrate, a wafer, a sapphire substrate, a ceramic substrate or a substrate made by other materials. The substrate 100 mayo be a flexible substrate, such as a plastic substrate or a film, and its material may include polycarbonate (PC), polyimide (PI), polypropylene (PP), polyethylene terephthalate (PET) or other plastic materials, but the present disclosure is not limited thereto. The materials of the data lines 11, the data fan-out lines 12, the first data pads 13, the touch lines 21, the touch fan-out lines 22 and the first touch pads 23 may be the same or different, and their materials may include a metal, a metal oxide, an alloy thereof, or a combination thereof, for example, gold, silver, copper, aluminum, platinum, indium zinc oxide (IZO), indium tin oxide (ITO), indium tin zinc oxide (ITZO), indium gallium zinc oxide (IGZO), or aluminum zinc oxide (AZO), but the present disclosure is not limited thereto. In the present disclosure, the numbers of the plurality of data lines 11, the plurality of data fan-out lines 12, the plurality of first data pads 13, the plurality of touch lines 21, the plurality of touch fan-out lines 22 and the plurality of first touch pads 23 are not particularly limited. In some embodiments of the present disclosure, the number of the plurality of data lines 11 is the same as the number of the plurality of data fan-out lines 12, and the number of the plurality of touch lines 21 is the same as the number of the plurality of touch fan-out lines 22. In some embodiments of the present disclosure, the number of the plurality of first data pads 13 is greater than the number of the plurality of data lines 11 or the number of the plurality of data fan-out lines 12, and the number of the plurality of first touch pads 23 is equal to the number of the plurality of touch lines 21 or the number of the plurality of touch fan-out lines 22.

In the present disclosure, one of the plurality of data lines 11 is electrically connected to one of the plurality of data fan-out lines 12, and one of the plurality of data fan-out lines 12 is electrically connected to one of the plurality of first data pads 13. That is, the plurality of data lines 11 may be electrically connected to the plurality of first data pads 13 through the plurality of data fan-out lines 12 to output or input data signals from the touch electronic device. Similarly, one of the plurality of touch lines 21 is electrically connected to one of the plurality of touch fan-out lines 22, and one of the plurality of touch fan-out lines 22 is electrically connected to one of the plurality of first touch pads 23. Thus, the plurality of touch lines 21 may be electrically connected to the plurality of first touch pads 23 through the plurality of touch fan-out lines 22 to output or input touch signals from the touch electronic device.

More specifically, as shown in FIG. 1, the plurality of data lines 11 may comprise, for example, data lines 111, 112, 113, 114, 115 and 116; the plurality of data fan-out lines 12 may comprise, for example, data fan-out lines 121, 122, 123, 124, 125 and 126; and the plurality of first data pads 13 may comprise, for example, first data pads 131, 132, 133, 134, 135 and 136. The data line 111 may be electrically connected to the data fan-out line 121, and the data fan-out line 121 may be electrically connected to the first data pads 131.

Thus, the data line 111 may be electrically connected to the first data pad 131 through the data fan-out line 121. Similarly, the data lines 112, 113, 114, 115 and 116 may be respectively electrically connected to the data fan-out lines 122, 123, 124, 125 and 126 corresponding thereto, and the data fan-out lines 122, 123, 124, 125 and 126 may be respectively electrically connected to the first data pads 132, 133, 134, 135 and 136 corresponding thereto. Thus, the data lines 112, 113, 114, 115 and 116 may be respectively electrically connected to the first data pads 132, 133, 134, 135 and 136 through the data fan-out lines 122, 123, 124, 125 and 126 to transmit data signals. Similarly, as shown in FIG. 1, the plurality of touch lines 21 may comprise, for example, touch lines 211, 212 and 213; the plurality of touch fan-out lines 22 may comprise, for example, touch fan-out lines 221, 222 and 223; and the plurality of first touch pads 23 may comprise, for example, first touch pads 231, 232 and 233. The touch line 211 may be electrically connected to the touch fan-out line 221, and the touch fan-out line 221 may be electrically connected to the first touch pad 231. Thus, the touch line 211 may be electrically connected to the first touch pad 231 through the touch fan-out line 221. Similarly, the touch lines 212 and 213 may be respectively electrically connected to the touch fan-out lines 222 and 223 corresponding thereto, and the touch fan-out lines 222 and 223 may be respectively electrically connected to the first touch pads 232 and 233 corresponding thereto. Thus, the touch lines 212 and 213 may be respectively electrically connected to the first touch pads 232 and 233 through the touch fan-out lines 223 and 223 to transmit touch signals.

In the present disclosure, as shown in FIG. 1 and FIG. 2, any of the plurality of data fan-out lines 12 and any of the touch fan-out lines 22 are not overlapped in a top view direction Z of the substrate 100. In this way, defects such as impedance mismatch or electrostatic damage caused by cross-line design can be reduced.

In addition, as shown in FIG. 1 and FIG. 2, the touch electronic device of the present disclosure may further comprise a plurality of function pads FP, and the plurality of first data pads 13 and the plurality of first touch pads 23 may be disposed between the plurality of function pads FP. In some embodiments, the plurality of first data pads 13, the plurality of first touch pads 23 and the plurality of function pads FP may be alternately arranged, so that a part of the plurality of function pads FP may be arranged between a part of the plurality of first data pads 13 and a part of the plurality of first touch pads 23. In the present disclosure, the function pads FP may be prepared using the same or different materials as the first data pads 13 or the first touch pads 23, and the materials of which are as mentioned above and are not described again. In addition, even not shown in the figure, the touch electronic device of the present disclosure may further comprise another substrate opposite to the substrate 100. In the present disclosure, the substrate 100 may be, for example, a transistor substrate (TFT substrate); and the other substrate may be, for example, a color filter substrate or a cover substrate. However, the present disclosure is not limited thereto. In some embodiments, the other substrate may be a thin film covering the data lines 11 and the touch lines 21. In the present disclosure, even not shown in the figure, the touch electronic device may selectively comprise a backlight module disposed below the substrate 100. The backlight module may comprise various components, such as a back frame, a light source, a light guide plate, a reflection sheet, and an optical film set, which are not described here.

In the present disclosure, as shown in FIG. 2, the touch electronic device may further comprise: a display unit 3 and a touch sensing unit 4 respectively disposed on the substrate 100 and in the active region AA of the substrate 100. The display unit 3 may be electrically connected to one of the plurality of first data pads 13 through one of plurality of data lines 11 and one of the plurality of data fan-out lines 12 to transmit data signals. Similarly, the touch sensing unit 4 may be electrically connected to one of the plurality of touch lines 21 through a through hole 5, and further electrically connected to one of the plurality of touch fan-out lines 22 and one of the plurality of first touch pads 23 through the touch line 2 to transmit touch signals.

In the present disclosure, the touch electronic device may comprise a display unit 3, which may comprise, for example, a display medium and transistors or electrodes (such as transistor and pixel electrodes) for controlling the states of the display medium. The display medium may comprise, for example, liquid crystals, organic light emitting diodes (OLEDs), inorganic light emitting diodes (LEDs), mini-light emitting diodes (mini-LEDs), micro-light emitting diodes (micro-LEDs), quantum dots (QDs), quantum dot diodes (QLEDs/QDLEDs), electro-phoretic, fluorescence, phosphors, other suitable materials or a combination thereof, but the present disclosure is not limited thereto. The touch sensing unit 4 may include touch electrodes, and the touch electrodes may be made of transparent materials, such as IZO, ITO, ITZO, IGZO, or AZO, but the disclosure is not limited thereto. Alternatively, the touch electrodes can be metal grids made of a metal or a metal alloy, such as copper or silver, but the disclosure is not limited thereto.

Figure 3:
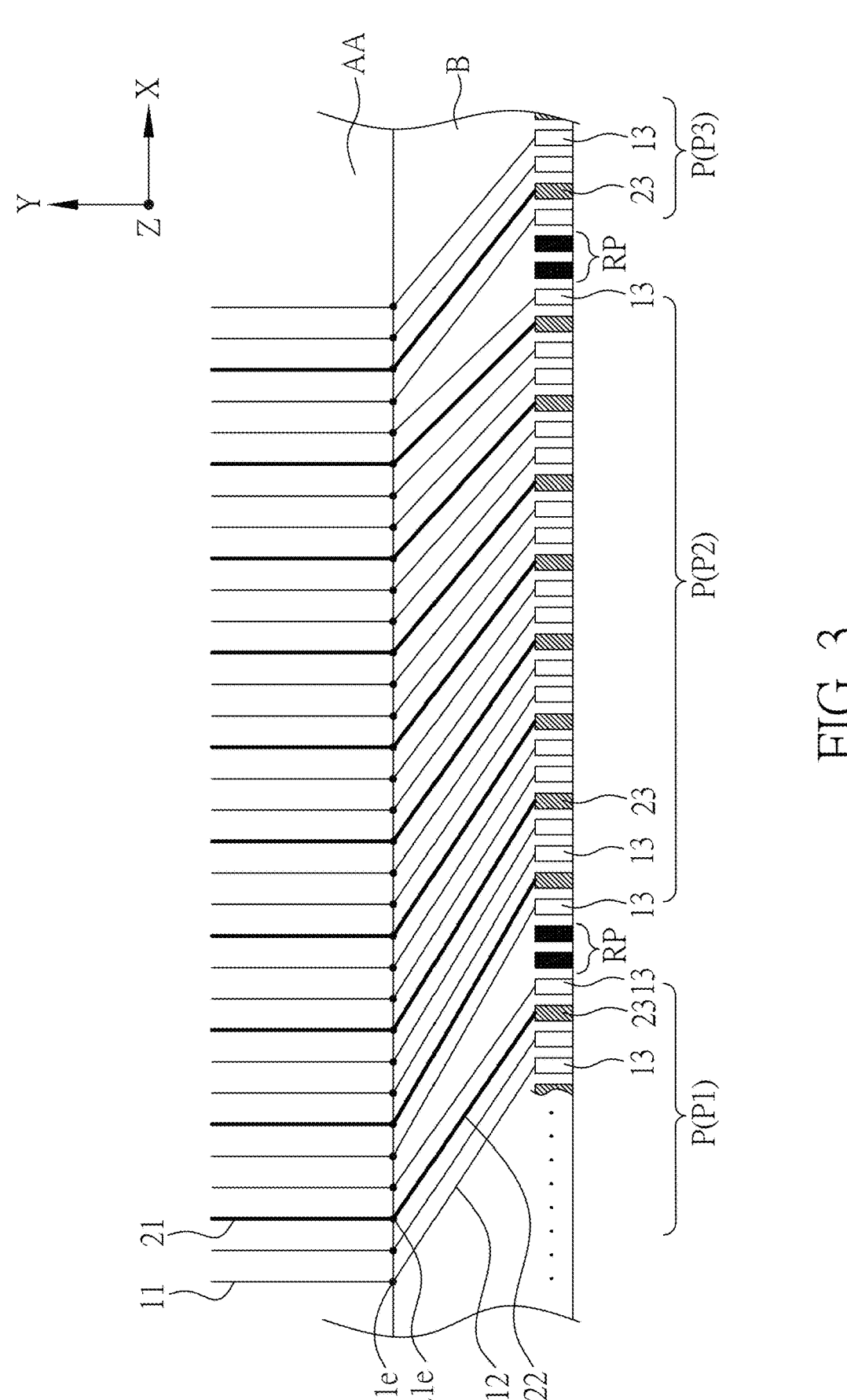
FIG. 3 is a partially enlarged view of the region marked by the dotted line of FIG. 2.

FIG. 3 is a partially enlarged view of the region marked by the dotted line of FIG. 2.

In some embodiments of the present disclosure, as shown in FIG. 3, the plurality of first data pads 13 and the plurality of first touch pads 23 may be arranged into a plurality of signal pad groups P (such as P1, P2 and P3), and the plurality of data lines 11 and the plurality of touch lines 21 are respectively electrically connecting to one of the plurality of signal pad groups P. More specifically, taking one of the plurality of signal pad groups P as an example (such as P2), one of the plural data lines 11 may be electrically connected to one first data pad 13 in the group P2, and one of the plurality of touch lines 21 may be electrically connected one first touch pad 23 in the group P2. In addition, in the group P2, a ratio of a number of the plurality of first data pads 13 to a number of the plurality of first touch pads 23 is an integer. For example, as shown in FIG. 3, in some embodiments of the present disclosure, the plurality of signal pad groups P may respectively include 16 first data pads 13 and 8 first touch pads 23, and therefore, the ratio of the number of the first data pads 13 to the number of the first touch pads 23 is 2; but the present disclosure is not limited thereto. In addition, the touch electronic device of the present disclosure may further comprise at least one redundancy pad RP disposed on the substrate 100 and disposed between two adjacent signal pad groups P. Herein, the redundancy pad RP is electrically insulated from the data fan-out lines 12 or the touch fan-out lines 23. The "redundant pad RP" refers to a pad that is electrically insulated from the data fan-out lines 12 or the touch fan-out lines 23, and therefore, signals cannot be transmitted through the redundant pad RP.

In the present disclosure, as shown in FIG. 3, ends 11e of the plurality of data lines 11 and ends 21e of the plurality of touch lines 21 may be arranged in a first arrangement order along a first direction X, and the plurality of first data pads 13 and the plurality of first touch pads 23 within one of the plurality of signal pad groups P may be arranged in a second arrangement order along the first direction X, wherein the first arrangement order may be the same as the second arrangement order. It should be noted that, in the present disclosure, the ends 11e of the plurality of data lines 11 and the ends 21e of the plurality of touch lines 21 refer to the intersections of the plural data lines 11 and the boundary line of the active region AA and the intersections of the plural touch lines 21 and the boundary line of the active region AA. In addition, when the touch electronic device comprises the redundant pads RP, the second arrangement order refers to the arrangement order of the plurality of first data pads 13 and the plurality of first touch pads 23 after excluding the redundant pads RP. Furthermore, the plurality of data fan-out lines 12 and the plurality of touch fan-out lines 22 may be arranged in a third arrangement order along the first direction X, and the first arrangement order may be the same as the third arrangement order. Thus, when the first arrangement order, the second arrangement order and the third arrangement order are the same, the data lines 11 are electrically connected to the first data pads 13 through the data fan-out lines 12, the touch lines 21 are electrically to the first touch pads 23 through the touch fan-out lines 22, and the data fan-out lines 12 and the touch fan-out lines 22 do not need cross-line designs, which can reduce defects such as impedance mismatch or electrostatic damage. The "arrangement orders are the same" means that the signal types are arranged in the same order. For example, as shown in FIG. 3, along the first direction X, among the traces (including the data lines 11 and the touch lines 21) electrically connected to one of the plurality of signal pad groups P (for example, the group P2), the arrangement order of the signal types of the trace ends (including the ends 11e of the data lines 11 and the ends 21e of the touch lines 21) from left to right is data signal-touch signal-data signal-data signal-touch signal-data signal. . . . In the group P2, the arrangement order of the signal types of the pads (including the first data pads 13 and the first touch pads 23) from left to right is also data signal-touch signal-data signal-data signal-touch signal-data signal. . . . Thus, the data fan-out lines 12 and the touch fan-out lines 22 do not need cross-line designs, which can reduce defects such as impedance mismatch or electrostatic damage.

Figures 4A, 4B:
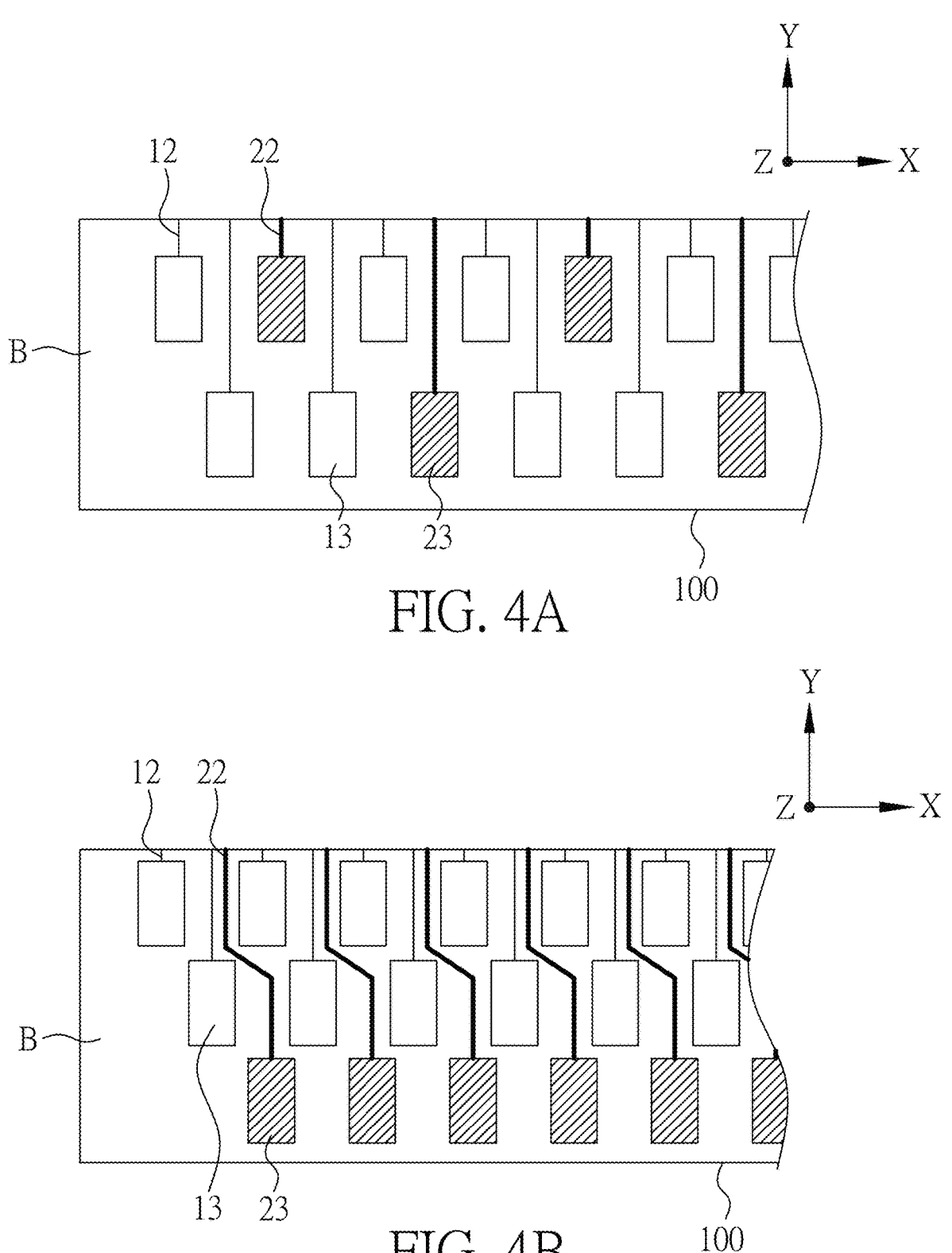
FIG. 4A and FIG. 4B are schematic views of a part of a peripheral region of according to some embodiments of the present disclosure.

FIG. 4A and FIG. 4B are schematic views of a part of a peripheral region of according to some embodiments of the present disclosure. FIG. 4A and FIG. 4B are similar to FIG. 3, except for the following differences. In addition, the active region AA of the touch electronic device is not shown in FIG. 4A and FIG. 4B for convenience of explanation.

In some embodiments of the present disclosure, the arrangement of the first data pads 13 and the first touch pads 23 may be different from that shown in FIG. 3. More specifically, the first data pads 13 and the first touch pads 23 shown in FIG. 3 are arranged in a straight line, while the first data pads 13 and first touch pads 23 shown in FIG. 4A and FIG. 4B may be arranged in steps. For example, in FIG. 4A, the first data pads 13 and the first touch pads 23 are arranged in an arrangement order of two rows to form a two-step arrangement. In FIG. 4B, the first data pads 13 and the first touch pads 23 are arranged in an arrangement order of upper-middle-lower rows to form a three-step arrangement. However, the present disclosure is not limited thereto.

In the periphery regions B of the touch electronic devices shown in FIG. 4A and FIG. 4B, similar to the touch electronic device shown in FIG. 1, the first data pads 13 and the first touch pads 23 may be electrically connected to the display unit (not shown in the figure) and the touch sensing unit (not shown in the figure) in the active region (not shown in the figure) through the data fan-out lines 12, the touch fan-out lines 22, the data lines (not shown in the figure) and the touch lines (not shown in the figure), respectively. In addition, any of the plurality of data fan-out lines 12 and any of the touch fan-out lines 22 are not overlapped in the top view direction Z of the substrate 100. In this way, defects such as impedance mismatch or electrostatic damage caused by cross-line design can be reduced. In addition, as shown in FIG. 4B, the plurality of touch fan-out lines 22 may be bend lines according to actual needs, so as to increase the arrangement density of the first data pads 13, the first touch pads 23, the data fan-out lines 12 and the touch fan-out lines 22. This design can reduce the size of the circuit board or the chip electrically connected to these first data pads 13 and these first touch pads 23, or increase the number of transmitted signals under the same size of the circuit board or the chip. In some other embodiments, at least a part of the data fan-out lines 12 may be bend lines.

In some embodiments of the present disclosure, the first data pads 13 and the first touch pads 23 may be formed by the same layer or different layers. That is to say, there may be other layers between the first data pads 13 and the substrate 100 and between the first touch pads 23 and the substrate 100, and the number of layers between the first data pads 13 and the substrate 100 may be the same as or different from the number of layers between the first touch pads 23 and the substrate 100, so that the first data pads 13 and the first touch pads 23 may be formed by the same layer or different layers. When first data pads 13 and the first touch pads 23 have single-layer designs, as shown in FIG. 4A and FIG. 4B, the first data pads 13 and the first touch pads 23 may be made of the same or different materials respectively. When the first data pads 13 and the first touch pads 23 are made of the same material, they can be formed through the same lithography process to simplify the process steps. In addition, in some embodiments of the present disclosure, when the data fan-out lines 12 and the touch fan-out lines 22 are formed by different layers, the short circuit caused by the short distance between adjacent fan-out lines can be avoided, or the size of the peripheral region B of the touch electronic device can be reduced to achieve a narrow bezel design.

Figures 5A, 5B, 5C:
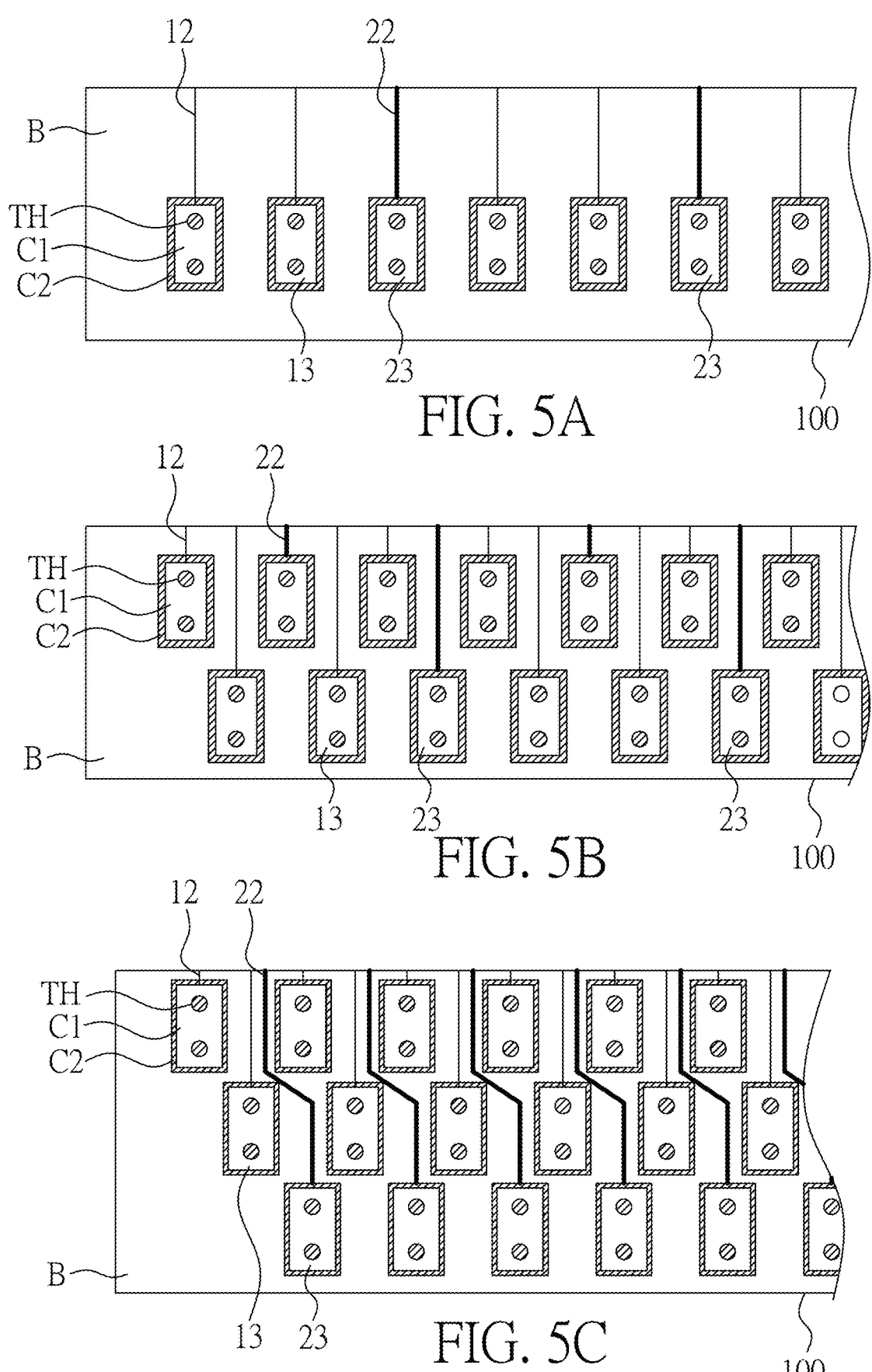
FIG. 5A to FIG. 5C are schematic views of a part of a peripheral region of according to some embodiments of the present disclosure.

FIG. 5A is a schematic view of a part of a peripheral region of according to some embodiments of the present disclosure. FIG. 5A is similar to FIG. 3, except for the following differences. In addition, the active region AA of the touch electronic device is not shown in FIG. 5A for convenience of explanation.

In some embodiments of the present disclosure, the first data pads 13 and the first touch pads 23 may respectively comprises a single-layer structure (as shown in FIG. 3) or a multi-layer structure. When the first data pads 13 and the first touch pads 23 respectively have the multi-layer structure, as shown in FIG. 5A and FIG. 5B, the first data pads 13 and/or the first touch pads 23 may be respectively formed by a first conductive layer C1 and a second conductive layer C2. More specifically, the first conductive layer C1 may be disposed on the second conductive layer C2, and the first conductive layer C1 and the second conductive layer C2 are electrically connected to each other through the through holes TH. Herein, the first data pads 13 refer to the pads electrically connected to the data fan-out lines 12, and the first touch pads 23 refers to the pads electrically connected to the touch fan-out lines 22. When the data fan-out lines 12 and the touch fan-out lines 22 are formed by different layers, the data fan-out lines 12 may be electrically connected to the first data pads 13 through the first conductive layer C1, and the touch fan-out lines 22 may be electrically connected to the first touch pads 23 through the second conductive layer C2. However, the present disclosure is not limited thereto. For example, in some embodiments, the data fan-out lines 12 may be electrically connected to the first data pads 13 through the second conductive layer C2, and the touch fan-out lines 22 may be electrically connected to the first touch pads 23 through the first conductive layer C1. In the present disclosure, the materials of the first conductive layer C1 and the second conductive layer C2 may be similar to those described above, and are not described again.

FIG. 5B and FIG. 5C are schematic views of a part of a peripheral region of according to some embodiments of the present disclosure. FIG. 5B and FIG. 5C are similar to FIG. 5A, except for the following differences.

In some embodiments of the present disclosure, the arrangement of the first data pads 13 and the first touch pads 23 may be different from that shown in FIG. 5A. More specifically, the first data pads 13 and the first touch pads 23 shown in FIG. 5A are arranged in a straight line, while the first data pads 13 and first touch pads 23 shown in FIG. 5B and FIG. 5C may be arranged in steps. For example, FIG. 5B shows the two-step arrangement and FIG. 5C shows the three-step arrangement, but the present disclosure is not limited thereto.

In the periphery regions B of the touch electronic devices shown in FIG. 5B and FIG. 5C, similar to the touch electronic device shown in FIG. 1, the first data pads 13 and the first touch pads 23 may be electrically connected to the display unit (not shown in the figure) and the touch sensing unit (not shown in the figure) in the active region (not shown in the figure) through the data fan-out lines 12, the touch fan-out lines 22, the data lines (not shown in the figure) and the touch lines (not shown in the figure), respectively. In addition, any of the plurality of data fan-out lines 12 and any of the touch fan-out lines 22 are not overlapped in the top view direction Z of the substrate 100. In this way, defects such as impedance mismatch or electrostatic damage caused by cross-line design can be reduced. In addition, as shown in FIG. 5C, the plurality of touch fan-out lines 22 may be bend lines according to actual needs, so as to increase the arrangement density of the first data pads 13, the first touch pads 23, the data fan-out lines 12 and the touch fan-out lines 22. This design can reduce the size of the circuit board or the chip electrically connected to these first data pads 13 and these first touch pads 23, or increase the number of transmitted signals under the same size of the circuit board or the chip. In some other embodiments, at least a part of the data fan-out lines 12 may be bend lines.

Figure 6:
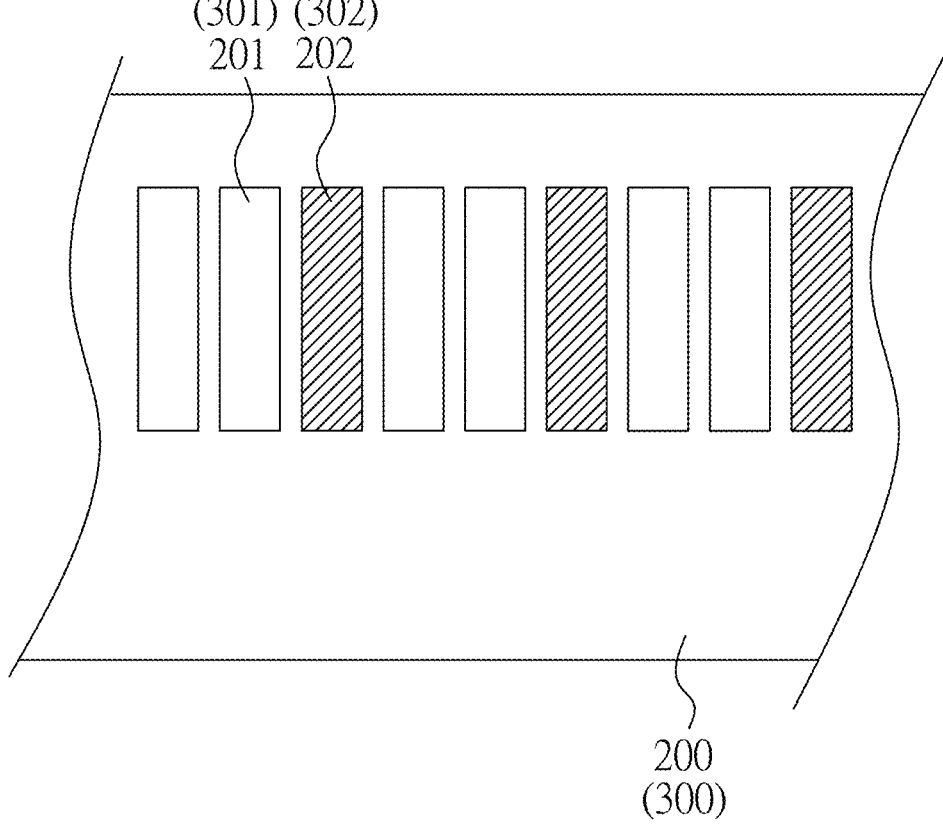
FIG. 6 is a schematic view of a part of a circuit board according to one embodiment of the present disclosure.

FIG. 6 is a schematic view of a part of a circuit board according to one embodiment of the present disclosure.

As shown in FIG. 6, the touch electronic device of the present disclosure may further comprise: a circuit board 200; a plurality of second data pads 201 disposed on the circuit board 200; and a plurality of second touch pads 202 disposed on the circuit board 200. Even not shown in the figure, in one embodiment of the present disclosure, the plurality of first data pads 13 shown in FIG. 1 may be respectively electrically connected to the plurality of second data pads 201, and the plurality of first touch pads 23 shown in FIG. 1 may be respectively electrically connected to the plurality of second touch pads 202 to output signals to an external controller or input signals to the active region AA. In addition, the arrangement order of the plurality of second data pads 201 and the plurality of second touch pads 202 on the circuit board 200 may correspond to the arrangement order of the first data pads 13 and the first touch pads 23 on the substrate 100.

Furthermore, in some embodiments of the present disclosure, the touch electronic device of the present disclosure may further comprise an integrated circuit 300, wherein the integrated circuit 300 may be provided with a plurality of third data pads 301 and a plurality of third touch pads 302 as shown in FIG. 6, and the plurality of third data pads 301 and the plurality of third touch pads 302 may be respectively electrically connected to the plurality of first data pads 13 and the plurality of first touch pads 23 shown in any of FIG. 1 to FIG. 5C to switch or control signal output to an external controller or signal input to the active region AA. In addition, the arrangement order of the plurality of third data pads 301 and the plurality of third touch pads 302 on the integrated circuit 300 may correspond to the arrangement order of the first data pads 13 and the first touch pads 23 on the substrate 100.

The embodiments above should be interpreted as illustrative only, not limiting the rest of the disclosure in any way, and the features of different embodiments can be mixed and matched as long as they do not conflict with each other.

Although the present disclosure has been explained in relation to its embodiment, it is to be understood that many other possible modifications and variations can be made without departing from the spirit and scope of the disclosure as hereinafter claimed.

The invention claimed is:

1. An electronic device, comprising:
a substrate comprising a periphery region;
a plurality of first pads disposed on the substrate and in the periphery region;
a plurality of second pads disposed on the substrate and in the periphery region; and
a plurality of redundancy pads disposed on the substrate and in the periphery region,
wherein the plurality of first pads are configured to transmit a plurality of data signals by a plurality of first fan-out lines, the plurality of second pads are configured to transmit signals that are different from touch and data, and the plurality of first pads and the plurality of redundancy pads are disposed between two of the plurality of second pads, wherein the plurality of redundancy pads are electrically insulated from the plurality of first fan-out lines and are not electrically connected to any conductive line, and at least one of the plurality of redundancy pads is disposed between the plurality of first pads and one of the two of the plurality of second pads.

2. The electronic device of claim 1, wherein the plurality of redundancy pads are disposed between a first portion of the plurality of first pads and a second portion of the plurality of first pads.

3. The electronic device of claim 1, wherein the first fan-out lines are electrically connected to the plurality of first pads.

4. The electronic device of claim 1, further comprising a plurality of third pads disposed on the substrate and in the periphery region and configured to transmit a plurality of touch signals by a plurality of second fan-out lines, wherein the plurality of first fan-out lines and the plurality of second fan-out lines are formed by different layers.

5. The electronic device of claim 1, wherein the plurality of first pads and the plurality of second pads are made of a same material.

6. The electronic device of claim 4, wherein the plurality of first pads and the plurality of third pads are disposed between the plurality of second pads.

7. The electronic device of claim 1, wherein signals cannot be transmitted through the plurality of redundancy pads.

5

* * * * *